US009026617B2

(12) United States Patent  (10) Patent No.: US 9,026,617 B2
Gombert et al.  (45) Date of Patent: May 5, 2015

(54) USB PORTABLE DOCUMENT SERVICES ENVIRONMENT

(71) Applicant: Xerox Corporation, Norwalk, CT (US)

(72) Inventors: Barry G. Gombert, Rochester, NY (US); Frank M. Goetz, Fairport, NY (US); George L. Eldridge, Long Beach, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/079,720

(22) Filed: Nov. 14, 2013

(65) Prior Publication Data

US 2014/0074980 A1  Mar. 13, 2014

Related U.S. Application Data

(62) Division of application No. 11/422,766, filed on Jun. 7, 2006, now Pat. No. 8,850,077.

(51) Int. Cl.
*H04L 29/08* (2006.01)
*G06F 9/445* (2006.01)
*H04W 4/02* (2009.01)

(52) U.S. Cl.
CPC ............... *H04L 67/02* (2013.01); *G06F 9/445* (2013.01); *H04W 4/02* (2013.01); *H04L 67/34* (2013.01); *H04L 67/303* (2013.01); *H04L 67/18* (2013.01)

(58) Field of Classification Search
CPC ................................ H04L 67/02; H04L 29/08
USPC .......................................... 709/217, 219, 220
See application file for complete search history.

(56) References Cited

U.S. PATENT DOCUMENTS

| 7,685,249 | B2* | 3/2010 | Kiwada et al. ................ 709/213 |
| 7,756,955 | B2* | 7/2010 | Takagi ........................... 709/221 |
| 2001/0029521 | A1 | 10/2001 | Matsuda et al. |
| 2002/0019827 | A1 | 2/2002 | Shiman et al. |
| 2003/0005100 | A1 | 1/2003 | Barnard et al. |
| 2003/0135668 | A1* | 7/2003 | Abe .................................. 710/15 |
| 2005/0066072 | A1* | 3/2005 | Nakamura ....................... 710/8 |
| 2005/0086241 | A1 | 4/2005 | Ram et al. |
| 2005/0162688 | A1 | 7/2005 | Nakaoka et al. |
| 2006/0230286 | A1 | 10/2006 | Kitada |
| 2006/0282571 | A1 | 12/2006 | Choi et al. |

(Continued)

OTHER PUBLICATIONS

"PrintWhere Driver"—Jun. 2006 Printer-On http://www.printeron.com/blog/printeron-printwhere-driver-mobile-printing-windows-application/.*

(Continued)

*Primary Examiner* — Randy Scott
(74) *Attorney, Agent, or Firm* — Fox Rothschild LLP

(57) ABSTRACT

A method and system for providing a portable document services environment on a computer system is disclosed. An installation application may automatically be loaded from a portable device onto a computer system when the portable device is connected to the computer system. The computer system may automatically access a document service application on the portable device based on information contained in the installation application. One or more document service preferences may automatically be received from the portable device onto the computer system, and an electronic document may be selected. One or more document services may be performed for the selected electronic document based on the one or more document service preferences using the document service application.

6 Claims, 2 Drawing Sheets

(56) References Cited

U.S. PATENT DOCUMENTS

| | | | |
|---|---|---|---|
| 2007/0035763 A1 | 2/2007 | Bard et al. | |
| 2007/0064696 A1* | 3/2007 | Min | 370/392 |
| 2007/0078805 A1 | 4/2007 | Reddy et al. | |
| 2008/0005371 A1 | 1/2008 | Hill et al. | |

OTHER PUBLICATIONS

"Ricoh HotSpot Printer/MFP"—Ricoh Feb. 2007 http://www.ricoh-usa.com/services_and_solutions/hotspot/docs/pdf/RicohHotSpotMFPSellSheet.pdf.*

"Easyshare Photo Printer 500 Specifications", http://www.kodak.com/eknec/PageQuerier.jhtml?pq-locale=en_US&pq-path=7420, printed May 10, 2006, 3 pp.

"PrintWhere—How it Works", http://www.printeron.com/solutions/products/printwhere/how_it_works.html, printed May 10, 2006, 2 pp.

"PrintWhere Features", http://www.printeron.com/solutions/products/printwhere/features.html, printed May 10, 2006, 1 p.

"The benefits of printing with PrintWhere", http://printeron.com/solutions/products/printwhere/overview.html, printed May 10, 2006, 2 pp.

"PrintWhere—the free mobile print driver for Windows", http://printeron.com/solutions/products/printwhere.html, printed May 10, 2006, 2 pp.

"Your Digital Universe in Your Pocket", http://www.u3.com/, printed May 10, 2006, 2 pp.

"U3 Software Central: Your Source for U3 Smart Software", http://software.u3.com/, printed May 10, 2006, 2 pp.

"Thinkfree Office, Portable Edition for U3", http://software.u3.com/Product_Details.aspx?ProductId=112&Selection=1&Lang=en-US&Position=ENHPFS4T, printed May 10, 2006, 2 pp.

"Arcsoft Photoprinter", http://software.u3.com/Product_Details.aspx?ProductId=11&Selection=2&Lang=en-US, printed May 10, 2006, 2 pp.

"Preclick Photobackpack", http://software.u3.com/Product_Details.aspx?ProductId=38&Selection=2&Lang=en-US, printed May 10, 2006, 2 pp.

"1-Click Signupshield Suite", http://software.u3.com/Product_Details.aspx?ProductId=119&Selection=7&Lang=en-US, printed May 5, 2006, 2 pp.

"Carry It Easy", http://software.u3.com/Product_Details.aspx?ProductId=45&Selection=5&Lang=en-US, printed May 10, 2006, 2 pp.

"Expresssync U3 Edition", http://software.u3.com/Product_Details.aspx?ProductId=65&Selection=5&Lang=en-US, printed May 10, 2006, 2 pp.

"P.I. Protector Mobility Suite", http://software.u3.com/Product_Details.aspx?ProductId=24&Selection=5&Lang=en-US, printed May 10, 2006, 2 pp.

http://www.printeron.com/apps/printwheredriver.html "PrintWhere Driver"—Jun. 2006 Printer-On.

http://www.ricoh-usa.com/services_and_solutions/hotspot/doc/pdf/HotSpotPrinterMFPQuickRefGuide.pdf "Ricoh HotSpot Printer/MFP"—Ricoh Feb. 2007.

* cited by examiner ately accessing the document service application on the portable device by the computer system based on information contained in the installation application, automatically
USB PORTABLE DOCUMENT SERVICES ENVIRONMENT

CROSS-REFERENCE TO RELATED APPLICATIONS

This application claims priority to, and is a divisional application of, U.S. patent application Ser. No. 11/422,766, filed Jun. 7, 2006, the disclosure of which is incorporated by reference herein in its entirety.

BACKGROUND

1. Technical Field

The disclosed embodiments pertain to methods and systems for enabling portable computing. Specifically, the disclosed embodiments pertain to method and systems for enabling a user to transfer applications, data and/or preferences pertaining to document services from one computer network to another using a portable device.

2. Background

Presently, business travelers frequently visit locations remote from their home office. When visiting remote offices, such travelers frequently require document services, such as printing, faxing and the like, to be performed. When accessing a remote network, determining appropriate document service devices to access is traditionally performed via a manual process requiring, for example, print drivers to be installed and the like. Performing such a process manually is time consuming and inefficient. This is particularly so when the user is infrequently resident at the remote location.

In addition, a particular application used to print, modify, or otherwise access an electronic document may not be installed on a remote network. As such, a user might be unable to access electronic documents in remote networks and/or require installation of the program to access the electronic document. This can further exacerbate the inefficiencies of accessing a remote network using present technology.

U3 LLC of Redwood City, Calif. has defined a platform to extend the capability of USB flash drives that permits a user to carry applications and data, launch software and access data between multiple locations. Such drives simplify the process of transporting information to remote networks. However, no applications or devices have been created to transfer document service preferences between remote networks using this technology.

What is needed is a system and method for providing a portable document services environment.

A need exists for a system and method for determining one or more document service devices having features matching a user's document service preferences when connecting to a computer network.

A further need exists for a system and method for enabling a user to physically transfer document service preferences, data and applications created at one computer network to a second computer network.

The present embodiments are directed to solving one or more of the above-listed problems.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "device" is a reference to one or more devices and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method for providing a portable document services environment on a computer system may include automatically loading an installation application from a portable device on a computer system when the portable device is connected to the computer system, automatically accessing a document service application on the portable device by the computer system based on information contained in the installation application, automatically receiving one or more document service preferences from the portable device on the computer system, selecting an electronic document, and performing one or more document services for the selected electronic document based on the one or more document service preferences using the document service application.

In an embodiment, a system for providing a document services environment may include a computer system including a processor, a first processor-readable storage medium in communication with the processor and a first communication interface in communication with the processor, and a portable device including a second processor-readable storage medium and a second communication interface. The second processor-readable storage medium may contain an installation application, a document service application and one or more document service preferences. The second communication interface may be capable of being connected to the first communication interface. The first processor-readable storage medium contains one or more programming instructions for performing a method of providing a document services environment when the second communication port is connected to the first communication port. The method may include automatically loading the installation application from the portable device on the computer system when the portable device is connected to the computer system, automatically accessing the document service application on the portable device by the computer system based on information contained in the installation application, automatically receiving the one or more document service preferences from the portable device on the computer system, selecting an electronic document, and performing one or more document services for the electronic document based on the one or more document service preferences using the document service application.

In an embodiment, a method of utilizing document service preferences may include storing, within a storage medium of a portable device, one or more document service preferences for use with a first computer system, connecting the portable device to a second computer system, automatically selecting a document service device on the second computer network based on at least the one or more document service preferences, and performing a document service for an electronic document on the selected document service device. The first computer system may be in communication with a first computer network and the second computer system may be in communication with a second computer network that is physically remote from the first computer network. In an embodiment, selecting one or more document service devices may include identifying one or more document service devices connected to the second computer network, identifying one or more features of each identified document service device, comparing the one or more identified features for each identified document service device with the one or more document service preferences, and selecting one or more identified document service devices based on a closest match between the one or more identified features and the one or more document service preferences.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
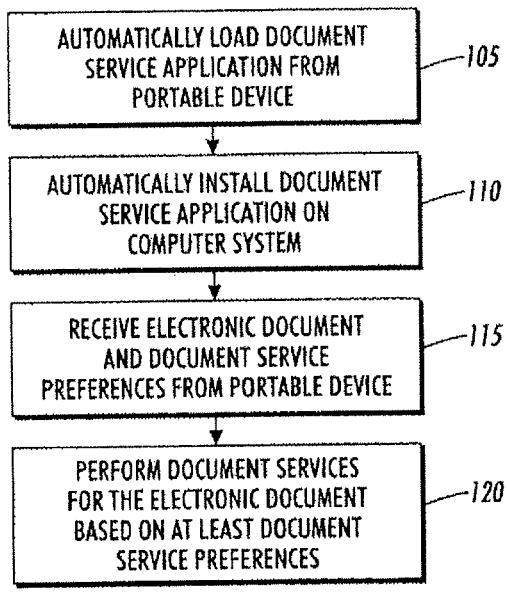
FIG. 1 depicts a flow diagram of an exemplary method of performing document services according to an embodiment.

FIG. 1 depicts a flow diagram of an exemplary method of performing document services according to an embodiment. As shown in FIG. 1, a document service application may be automatically loaded 105 from a portable device onto a computer system. A document service application is a software program or code segment that enables a user to perform operations on an electronic file. In an embodiment, particular electronic files may be presented in a human-readable form by accessing such electronic files via a corresponding document service application. The document service application may include, for example and without limitation, a word processing application, a spreadsheet application, a graphic arts application, a document creative application, and/or the like.

A portable device is a hardware device that includes one or more computer-readable storage media and a connection interface. The portable device may include, for example and without limitation, a Universal Serial Bus (USB) flash drive, a portable USB hard drive and/or the like.

In an embodiment, the portable device may be configured into, for example, two drive partitions. A first partition may operate in a manner similar to a read-only memory (ROM). The first partition may contain an installation application and associated data required for installation. An installation application may be a computer program that is used to manage access to other applications stored on the portable device. For example, the installation application may include a program manager application, such as the U3 Launchpad application developed by U3 LLC of Redwood City, Calif. The second partition may contain a document service application, one or more document service application preferences and one or more electronic documents.

In an embodiment, a document service application may be stored on the portable device by establishing a connection to a repository of document service applications that are compatible with the portable device. A user may then select an application for installation and the application may be downloaded and installed on the portable device. In an alternate embodiment, a document service application may be installed on the portable device at the time that the portable device is created.

When the portable device is inserted into a communication port of the computer system, the system may access the first partition and automatically install the installation application. The installation application may be used to manage the document service application installed on the portable device.

The installation application may be loaded 105 onto the computer system when the portable device is connected to the computer system. Loading 105 the installation application may be initiated at substantially the same time that the portable device is first connected to the computer system. A code segment on the portable device may direct the computer system to download 105 the installation application without human intervention. In an embodiment, the computer system may include, for example and without limitation, one or more of a computer, a group of networked computers, a printer, a facsimile machine, production printing services and the like.

The installation application may then access 110 the document service application on the portable device. In an embodiment, the document service application may be accessed at substantially the same time that the installation application is downloaded 105 onto the computer system. In an embodiment, the installation application may access 110 the document service application without human intervention. In an embodiment, the installation application may request that a user select a document service application prior to accessing 110 the document service application.

The computer system may receive 115 one or more document service preferences from the portable device. In an embodiment, the one or more document service preferences may be loaded 115 automatically. The one or more document service preferences may reside in the computer system, such as in a registry entry, while the portable device is in communication with the computer system. When the portable device is removed from communication with the computer system, the document service preferences may be automatically deleted from the computer system. In an embodiment, a code segment on the portable device may direct the computer system to download 115 one or more document service preferences from the portable device without human intervention.

In an embodiment, the one or more document service preferences may include one or more user preferences, one or more document service application preferences, and/or one or more document preferences for a received electronic document. In an embodiment, a user preference may include a preference that a user has for electronic documents serviced by all document service applications. For example, a user may request that electronic documents be spellchecked and/or printed on paper having a particular dimension. In an embodiment, a document service application preference may include a preference that a user has for electronic documents serviced by a particular document service application. In an embodiment, a document preference may include a preference that a user has for a particular electronic document. In an embodiment, a document preference may supersede document service application preferences and user preferences when such preferences are inconsistent. In an embodiment, a document service application preference may supersede user preferences when such preferences are inconsistent.

The computer system may further select an electronic document. The electronic document may be stored on the portable device. In an alternate embodiment, information stored on the portable device may be used to access an electronic document. For example, a Uniform Resource Locator (URL) may be stored on the portable device. The URL may represent a network location for an electronic document. Alternate and/or additional forms of information may also be stored on the portable device in order to access an electronic document that is not directly stored on the portable device. An electronic document may be used to access may include any file generated by or accessible using a document service application. In an embodiment, an electronic document may include a file containing information designed to be accessible to and/or modifiable by a user using a document service application.

One or more document services may then be performed 120 for an electronic document based on at least the one or more document service preferences. In an embodiment, the document services may be performed 120 using the document service application. A document service is an operation performed on an electronic document that prepares the electronic document to be rendered in a physical format and/or renders the electronic document in a physical format. In an embodiment, the document services may include, for example and without limitation, one or more of printing the electronic document, faxing the electronic document, formatting the electronic document, an enabling a user to edit the electronic document.

Figure 2:
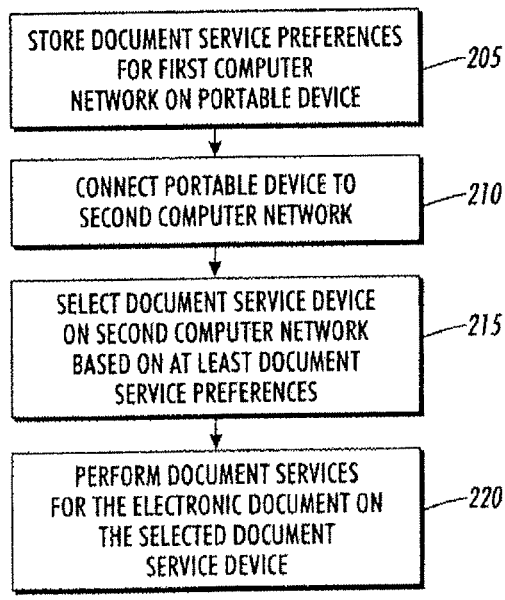
FIG. 2 depicts a flow diagram of an exemplary method of utilizing document service preferences to perform a document service according to an embodiment.

FIG. 2 depicts a flow diagram of an exemplary method of utilizing document service preferences to perform a document service according to an embodiment. As shown in FIG. 2, one or more document service preferences for use with a first computer network may be stored 205 within a storage medium of a portable device. The document service preferences may denote one or more features of appropriate devices within the first computer network for performing a document service. For example and without limitation, a document service preference may denote a paper size to use when printing a particular electronic document, a print quality for an electronic document, or the like. The portable device may include, for example and without limitation, a USB flash drive. In an embodiment, the portable device may include a storage medium that is accessible by a computer system, such as a computer, a plurality of networked computers, and/or a document service device. A document service device is a device that is used to render an electronic document to a physical form or to prepare an electronic document for rendering to a physical form. A document service device may include, for example and without limitation, a printer, a facsimile machine and/or the like.

The portable device may be connected 210 to a second computer network that is physically remote from the first computer network. In an embodiment, the document service devices available to users of the first computer network may be inaccessible or inconvenient to access for users of the second computer network. In an embodiment, the second computer network may not be directly accessible from the first computer network. For example, the first and second computer networks may be separate intranets for different companies, governmental agencies, educational institutions and/or the like. In an alternate embodiment, the first and second computer networks may be sub-networks of the same intranet that are, for example, physically remote from each other. For example, the first computer network may be a sub-network that is located within a first floor of a building, a first building, a first campus, a first city or a first country, and the second computer network may be a sub-network that is located within a second floor of a building, a second building, a second campus, a second city or a second country, respectively. Other logical and/or physical partitions forming first and second computer networks will be apparent to those of ordinary skill in the art based upon the teachings of this disclosure.

A document service device on the second computer network may be selected 215 based on at least the one or more document service preferences. In an embodiment, the document service device may include one or more of a printer, a facsimile machine, and/or the like. The document service device may be selected automatically based on at least document service preferences. In an embodiment, one or more document service devices connected to the second computer network may be identified. One or more features of each identified document service device may then be identified. In an embodiment, the features may correspond to services performable by the document service device. The one or more identified features for each identified device may then be compared with the document service preferences. One or more identified document service devices having features that most closely match the document service preferences may be selected for use.

A document service may then be performed 220 for the electronic document on a selected document service device. In an embodiment, the document services may be performed 220 based on one or more document service preferences. In an embodiment, the document services may include, for example and without limitation, one or more of printing the electronic document, faxing the electronic document, formatting the electronic document, an enabling a user to edit the electronic document.

Figure 3:
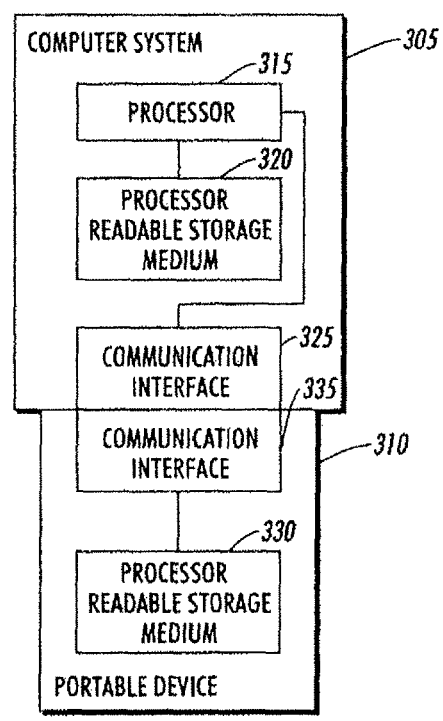
FIG. 3 depicts an exemplary system for performing document services according to an embodiment.

FIG. 3 depicts an exemplary system for performing document services according to an embodiment. As shown in FIG. 3, the system may include a computer system 305 and a portable device 310. The computer system 305 may include a processor 315, a processor-readable storage medium 320 and a communication interface 325. Each of the processor-readable storage medium 320 and the communication interface 325 may be in communication with the processor 315.

The portable device 310 may include a processor-readable storage medium 330 and a communication interface 335. Processor-readable storage medium 330 may contain a document service application, one or more electronic documents and one or more document service preferences. The document service application may be, for example and without limitation, a word processing application, a spreadsheet application or the like. The electronic documents may include any file that is accessible and/or modifiable by a document service application. Document service preferences may include one or more user preferences, one or more document service application preferences, and/or one or more document preferences for the received electronic document. In an embodiment, a user preference may include a preference that a user has for electronic documents serviced by all document service applications. For example, a user may request that documents be spellchecked and/or printed on paper having a particular dimension. In an embodiment, a document service application preference may include a preference that a user has for electronic documents serviced by a particular document service application. In an embodiment, a document preference may include a preference that a user has for a particular electronic document. In an embodiment, a document preference may supersede document service application preferences and user preferences when such preferences are inconsistent. In an embodiment, a document service application preference may supersede user preferences when such preferences are inconsistent. The communication interface 335 may be capable of being connected to communication interface 325. In an embodiment, the portable device 310 may include a USB flash drive.

In an embodiment, processor-readable storage medium 320 may contain one or more programming instructions for performing a method of providing a document services environment when communication interface 325 is connected to communication interface 335. The provision of a document services environment may include loading and/or installing a document service application, one or more electronic documents and/or one or more document service preferences from the portable device 310 into the computer system 305. A document service may then be performed for the one or more electronic documents by the computer system 305. In an embodiment, a document service device may be selected to perform a document service based on the one or more document service preferences.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of utilizing document service preferences, the method comprising:
    storing, within a storage medium of a portable device, one or more document service preferences for use with a first computer system, wherein the first computer system is in communication with a first computer network;
    connecting the portable device to a second computer system, wherein the second computer system is in communication with a second computer network that is physically remote from the first computer network;
    automatically loading an installation application from the portable device on the second computer system to manage a document service application when the portable device is connected to the second computer system,
    automatically selecting a document service device on the second computer network based on at least the one or more document service preferences from the portable device; and
    performing a document service for an electronic document on the selected document service device.

2. The method of claim 1 wherein the first computer network comprises a first intranet and the second computer network comprises a second intranet.

3. The method of claim 1 wherein the first computer network comprises a first sub-network of an intranet and the second computer network comprises a second sub-network of the intranet.

4. The method of claim 1 wherein the one or more document service devices comprise one or more of the following:
    a printer; and
    a facsimile machine.

5. The method of claim 1 wherein selecting a document service device comprises:
    identifying one or more document service devices connected to the second computer network;
    identifying one or more features of each identified document service device;
    comparing the one or more identified features for each identified document service device with the one or more document service preferences; and
    selecting an identified document service device based on a closest match between the one or more identified features and the one or more document service preferences.

6. The method of claim 1 wherein the one or more document services comprise one or more of the following:
    printing the electronic document;
    faxing the electronic document;
    formatting the electronic document; and
    editing the electronic document.

* * * * *